United States Patent [19]

Endou et al.

[11] Patent Number: 6,063,829
[45] Date of Patent: May 16, 2000

[54] METHOD FOR LIQUID CRYSTAL ALIGNMENT

[75] Inventors: Hideyuki Endou; Hiroyoshi Fukuro, both of Funabashi, Japan

[73] Assignee: Nissan Chemical Industries, Ltd., Tokyo, Japan

[21] Appl. No.: 09/142,049

[22] Filed: Sep. 4, 1998

[30] Foreign Application Priority Data

Mar. 5, 1996 [JP] Japan ................................. 8-047290

[51] Int. Cl.$^7$ ............................. C08J 3/28; C09K 19/00; C08G 69/26; G02F 1/1337; G02F 1/141
[52] U.S. Cl. .................... 522/164; 522/162; 522/134; 428/1; 528/350; 528/353; 349/124; 349/134; 349/136
[58] Field of Search ..................... 522/164, 134, 522/167; 528/353, 350; 349/124, 134, 136; 430/20; 359/FOR 120, FOR 121

[56] References Cited

U.S. PATENT DOCUMENTS

| | | | |
|---|---|---|---|
| 5,061,509 | 10/1991 | Naito et al. | 427/13 |
| 5,700,860 | 12/1997 | Nishikawa et al. | 524/317 |
| 5,764,326 | 6/1998 | Hasegawa et al. | 349/124 |

FOREIGN PATENT DOCUMENTS

| | | |
|---|---|---|
| 0 735 403 A1 | 10/1996 | European Pat. Off. . |
| 7/036047 | 2/1995 | Japan . |
| 8/262450 | 10/1996 | Japan . |

*Primary Examiner*—James J. Seidleck
*Assistant Examiner*—Sanza McClendon
*Attorney, Agent, or Firm*—Oblon, Spivak, McClelland, Maier & Neustadt, P.C.

[57] ABSTRACT

A treating method for liquid crystal alignment, which comprises applying polarized ultraviolet or electron rays to a polymer thin film formed on a substrate, in a predetermined direction relative to the substrate surface, and using the substrate to align liquid crystal without rubbing treatment, wherein the polymer thin film is a polyimide resin containing a repeating unit of the formula (I):

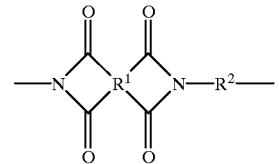

(I)

(wherein $R^1$ is a tetravalent organic group having an alicyclic structure, and $R^2$ is a bivalent organic group), which is obtained by dehydration ring-closure of a polyimide precursor having a reduced viscosity of from 0.05 to 3.0 dl/g (in N-methyl-2-pyrrolidone at temperature of 300° C. at a concentration of 0.5 g/dl)

7 Claims, No Drawings

METHOD FOR LIQUID CRYSTAL ALIGNMENT

TECHNICAL FIELD

The present invention relates to a treating method for liquid crystal alignment and more particularly to a treating method for alignment, which comprises aligning liquid crystal molecules by applying polarized rays to the surface of a polyimide film, without rubbing treatment, wherein a wide range of polyimide type resins are used from a more practical viewpoint.

BACKGROUND ART

Liquid crystal display devices are display devices utilizing electrooptical changes of liquid crystal, and an attention has been drawn to their features such that the devices are small in size and light in weight, and power consumption is small. Accordingly, in recent years, they have undergone remarkable developments as display devices for various displays. Among them, an electric field effect type liquid crystal display device of twisted nematic type (TN type) is representative wherein nematic liquid crystal having a positive dielectric anisotropy, is used, liquid crystal molecules are aligned in parallel with substrates at the respective interfaces of a pair of mutually opposing electrode substrates, and the two substrates are combined so that the alignment directions of liquid crystal molecules will cross each other.

With such a TN type liquid crystal display device, it is important to align long axial directions of liquid crystal molecules uniformly in parallel with the substrate surface and to align liquid crystal molecules with a constant tilt alignment angle (hereinafter referred to as a tilt angle) to the substrate.

As typical methods for aligning liquid crystal molecules in such a manner, two methods have heretofore been known. The first method is a method wherein an inorganic substance such as silicon oxide is vapor-deposited from an oblique direction to the substrate to form an inorganic film on the substrate, so that the liquid crystal molecules will be aligned in the direction of vapor-deposition. This method is not industrially efficient, although constant alignment with a predetermined tilt angle can be obtained. The second method is a method wherein an organic coating film is formed on the substrate surface, and the film surface is rubbed in a predetermined direction with a cloth of e.g. nylon or polyester so that liquid crystal molecules are aligned in the rubbing direction. By this method, constant alignment can be obtained relatively easily, and this method is industrially most commonly employed. As the organic film, polyvinyl alcohol, polyoxyethylene, polyamide or polyimide may, for example, be mentioned. However, polyimide is most commonly employed from the viewpoint of the chemical stability, thermal stability, etc. As typical examples of polyimide used for such liquid crystal alignment films, those disclosed in JP-A-61-47932 may be mentioned.

The treating method for liquid crystal alignment by rubbing polyimide is an industrially useful method which is simple and excellent in productivity. However, as the demands for high precision and high performance of liquid crystal display devices have increased and new display systems corresponding to such demands have been developed, various problems of the rubbing method have been pointed out. For example, a STN (Super Twisted Nematic) system wherein the twist angle of a TN type liquid crystal display is increased, an AM (Active Matrix) system wherein switching elements are formed for individual electrodes, and a FLC (ferroelectric) or AFLC (antiferroelectric) system wherein ferroelectric liquid crystal or antiferroelectric liquid crystal is employed, may be mentioned as such examples. In the STN system, contrast is high, and scratches on the alignment film surface formed by rubbing, become display defects. In the AM system, the mechanical force or static electricity due to rubbing is likely to destroy the switching elements, and dusting by rubbing tends to lead to display defects. In the FLC or AFLC system, it is difficult to satisfy both high speed response and uniform alignment of smectic liquid crystal only by simple rubbing treatment. Thus, various problems of the rubbing method have been made clear.

For the purpose of solving such problems, a so-called "rubbingless" alignment method wherein liquid crystal is aligned without rubbing, has been studied, and various methods have been proposed. For example, a method wherein photochromic molecules are introduced to the alignment film surface, so that molecules on the alignment film surface are aligned by light (JP-A-4-2844), a method wherein molecular chains constituting an alignment film, are aligned by means of a LB film (Langmuir-Blodgett film) (S. Kobayashi et al., Jpn. J. Appl. Phys., 27,475 (1988)) and a method wherein an alignment film is press-bonded on a preliminarily alignment-treated substrate to transfer the alignment (JP-A-6-43458), have been studied. However, when the industrial productivity is taken into account, they can not be said to be useful as substitutes for the rubbing method.

Whereas, various methods have been proposed wherein periodical irregularities are artificially formed on the alignment film surface, and liquid crystal molecules are aligned along such irregularities. The most simple method of this type is a method wherein a replica having periodical irregularities is preliminarily prepared, and a thermoplastic film is heated and pressed thereon to transfer the irregularities onto the film (JP-A-4-172320, JP-A-4-296820, JP-A-4-311926 etc.). By this method, it is certainly possible to prepare a film having periodical irregularities on its surface efficiently, but it has been impossible to obtain practical reliability as high as a polyimide film used in the rubbing method. Whereas, a method has been proposed in which a light with high energy, such as electron rays (JP-A-4-97130), $\alpha$-rays (JP-A-2-19836), X-rays (JP-A-2-2515) or eximer laser (JP-A-5-53513), is applied to a polyimide film having high reliability to form periodical irregularities on the film surface. However, to use a light source for such high energy, can not hardly be said to be an efficient treating method for alignment when an industrial production where alignment treatment is continuously carried out uniformly over the entire surface of a large size substrate, is taken into consideration.

On the other hand, as an efficient method for forming periodical irregularities on the surface of a polyimide film having high reliability, a photolithographic method may be mentioned. The polyimide is used as an insulating film for semiconductors by virtue of its high insulating property and excellent electric characteristics, and in recent years, a so-called photosensitive polyimide has been developed which is a polyimide having a photocurable nature by itself. There has been an attempt to form a periodical irregularities by a photolithographic method using this photocurable polyimide. By this method, irregularities have certainly been formed on the surface of the polyimide film, but since the photocurable polyimide was initially developed as an insulating film, the properties to align liquid crystal have been inadequate. Further, it has been necessary to apply a buffer coating layer (JP-A-4-245224), and consequently, the process has been complex and can not be regarded as an efficient treating method for alignment which can be a substitute for the rubbing method when the industrial productivity is taken into consideration.

As a new treating method for alignment which has recently been found, a method has been proposed in which polarized ultraviolet rays, etc. are applied to a polymer film surface to align liquid crystal molecules without carrying out rubbing treatment. The following reports are available as such examples.

W. M. Gibbons et al., Nature, 351, 49 (1991), Y. Kawanishi et al., Mol. Cryst. Liq. Cryst., 218, 153 (1992), M. Shadt et al., Jpn. J. Appl. Phys. 31, 2155 (1992), and Y. Iimura et al., Jpn. J. Appl. Phys. 32, L93 (1993).

These methods are characterized in that liquid crystal is aligned in a predetermined direction by irradiation of polarized light without requiring conventional rubbing treatment. These methods have merits such that they are free from problems such as static electricity and scratches on the film surface by the rubbing method, and the process is simple when industrial production is taken into consideration.

Namely, the liquid crystal alignment method using irradiation of polarized light proposed here is considered to be an attractive method as a new treatment method for liquid crystal alignment without requiring rubbing treatment, although it is still in a fundamental research stage.

As polymer materials used in the reports heretofore, specific polymer materials such as polyimides having polyvinyl cinnamate or an azo type dye mainly dispersed, have been employed from the necessity to obtain a photochemical sensitivity to polarized light, and it is disclosed that by applying polarized light on the surface of such polymer films, the liquid crystal molecules can be aligned in a predetermined direction.

However, in a case where liquid crystal alignment employing such irradiation of polarized light is to be practically applied in future, not only a function of liquid crystal alignment, but also various functions as a liquid crystal alignment film are simultaneously required to accomplish a high level of liquid crystal display. This means that the polymer material to be used as a liquid crystal alignment film is not simply limited to a specific material, and selection of a wider range of chemical structures, becomes important.

Further, from the viewpoint of the reliability and the alignment stability of liquid crystal molecules, it is considered preferred to use polyimide which has heretofore been used.

Namely, the object of the present invention is to use a more uniform highly reliable polyimide resin when liquid crystal alignment by irradiation of polarized light is applied to a practical liquid crystal display device, and to provide a treating method for alignment wherein a polyimide material type having a wide structural range for selection is used.

DISCLOSURE OF THE INVENTION

The present inventors have made extensive efforts and studies to solve the above problems and as a result, have accomplished the present invention. Namely, the present invention relates to a treating method for liquid crystal alignment, which comprises applying polarized ultraviolet or electron rays to a polymer thin film formed on a substrate, in a predetermined direction relative to the substrate surface, and using the substrate to align liquid crystal without rubbing treatment, wherein the polymer thin film is a polyimide resin containing a repeating unit of the formula (I):

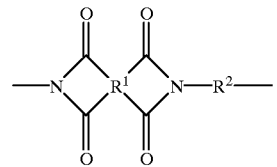

(wherein $R^1$ is a tetravalent organic group having an alicyclic structure, and $R^2$ is a bivalent organic group) which is obtained by dehydration ring-closure of a polyimide precursor having a reduced viscosity of from 0.05 to 3.0 dl/g (in N-methyl-2-pyrrolidone at temperature of 30° C. at a concentration of 0.5 g/dl).

BEST MODE FOR CARRYING OUT THE INVENTION

The treating method for liquid crystal alignment of the present invention is one wherein a polyimide film represented by the formula (I), is formed on a substrate provided with electrodes, such as glass or a plastic film provided with transparent electrodes, and then polarized ultraviolet rays are applied to the film surface, so that the substrate can be used as a liquid crystal alignment treated substrate without requiring rubbing treatment.

As the polyimide resin to be used for the treating method for liquid crystal alignment of the present invention, it is essential that the resin contains a repeating unit of the formula (I). By using such a polyimide resin, it becomes possible to align liquid crystal molecules by irradiation of polarized ultraviolet rays, in a predetermined direction relative to the polarization direction, and uniformly and constantly.

In the polyimide resin of the formula (I) to be used for the treating method for liquid crystal alignment of the present invention, as the tetracarboxylic acid component to be used, it is essential that it contains a tetracarboxylic acid component having an alicyclic structure in its structure. Preferably, it is a polyimide resin wherein, in the formula (I), $R^1$ contains a structure selected from the following structural formulae:

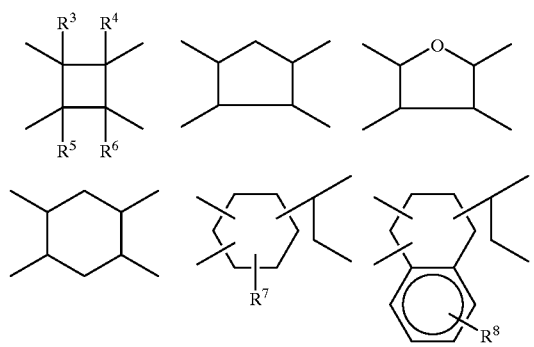

(wherein each of $R^3$, $R^4$, $R^5$ and $R^6$ is hydrogen or a $C_{1-4}$ organic group, $R^7$ is hydrogen, fluorine or a $C_{1-2}$ organic group, and $R^8$ is hydrogen, fluorine or a $C_{1-4}$ organic group.)

Specific examples of the tetracarboxylic acid components having the above structures, include alicyclic tetracarboxylic acids such as 1,2,3,4-cyclobutanetetracarboxylic acid, 1,2,3,4-cyclopentanetetracarboxylic acid, 2,3,4,5- tetrahydrofurantetracarboxylic acid, 1,2,4,5-cyclohexanetetracarboxylic acid, 3,4-dicarboxy-1-cyclohexylsuccinic acid and 3,4-dicarboxy-1,2,3,4-tetrahydro-1-naphthalenesuccinic acid, and their dianhydrides as well as their dicarboxylic acid diacid halides.

Particularly preferred from the viewpoint of liquid crystal alignment, is a polyimide resin wherein in the formula (I), $R^1$ contains the following structure, i.e. the tetracarboxylic acid components being 1,2,3,4-cyclobutanecarboxylic acid and its dianhydride as well as its carboxylic acid diacid halides.

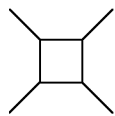

Further, these tetracarboxylic acids and their derivatives, may be used alone or in combination as a mixture of two or more of them.

Further, other tetracarboxylic acid dianhydrides may be used in combination within a range where the resulting polyimide resin is capable of providing the effects of the present invention upon irradiation of ultraviolet rays. Specific examples thereof include aromatic tetracarboxylic acids, such as pyromellitic acid, 2,3,6,7-naphthalenetetracarboxylic acid, 1,2,5,6-naphthalenetetracarboxylic acid, 1,4,5,8-naphthalenetetracarboxylic acid, 2,3,6,7-anthracenetetracarboxylic acid, 1,2,5,6-anthracenetetracarboxylic acid, 3,3',4,4'-biphenyltetracarboxylic acid, 2,3,3',4-biphenyltetracarboxylic acid, bis(3,4-dicarboxyphenyl)ether, 3,3',4,4'-benzophenonetetracarboxylic acid, bis(3,4-dicarboxyphenyl)sulfone, bis(3,4-dicarboxyphenyl)methane, 2,2-bis(3,4-dicarboxyphenyl)propane, 1,1,1,3,3,3-hexafluoro-2,2-bis(3,4-dicarboxyphenyl)propane, bis(3,4-dicarboxyphenyl)dimethylsilane, bis(3,4-dicarboxyphenl)diphenylsilane, 2,3,4,5-pyridinetetracarboxylic acid, and 2,6-bis(3,4-dicarboxyphenyl)pyridine, and their dianhydrides as well as their dicarboxylic acid diacid halides, and aliphatic tetracarboxylic acids such as 1,2,3,4-butanetetracarboxylic acid, and their dianhydrides as well as their dicarboxylic acid diacid halides.

Further, these tetracarboxylic acids and their derivatives may be used alone or in combination as a mixture of two or more of them.

Further, specific examples of a diamine component $R^2$ in the formula (I) of the present invention, are primary diamines which are commonly used for polyimide synthesis, and they are not particularly limited. However, such specific examples include aromatic diamines, such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminobiphenylmethane, diaminodiphenylether, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(aminophenoxy)phenyl]propane, 2,2-bis(4-aminophenyl)hexafluoropropane, and 2,2-bis[4-(4-aminophenoxy)phenyl]hexafluoropropane, alicyclic diamines such as bis(4-aminocyclohexyl)methane, and bis(4-amino-3-methylcyclohexyl)methane, and aliphatic diamines such as tetramethylenediamine, and hexamethylenediamine, as well as a diaminosiloxane such as

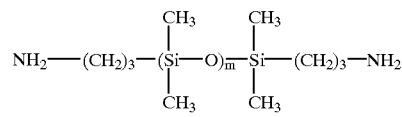

(m is an integer of from 1 to 10).

Further, for the purpose of increasing the tilt angle, a diamine having a long chain alkyl group, such as 4,4'-diamino-3-dodecyldiphenyl ether, or 1-dodecanoxy-2,4-diaminobenzene, may be used. These diamine components may be used alone or in combination as a mixture of two or more of them. Still further, it is also possible to employ a composition comprising a polyimide precursor and a monoamine having a long chain alkyl group, as disclosed in JP-A-62-297819, or a diimide composition containing a long chain alkyl group, as disclosed in e.g. JP-B-6-25834 and JP-B-6-25835.

It is essential for the polyimide resin of the present invention to contain a tetracarboxylic acid component having the above alicyclic structure, but the method for its production is not particularly limited. It is usually possible to employ a method wherein a tetracarboxylic acid or its derivative, and a diamine are reacted and polymerized in an organic solvent in a molar ratio within a range of from 0.50 to 2.0, preferably from 0.9 to 1.10 to obtain a polyimide resin precursor having a reduced viscosity of from 0.05 to 3.0 dl/g (in N-methyl-2-pyrrolidone at a temperature of 30° C. at a concentration of 0.5 g/dl), followed by dehydration ring-closure to obtain a polyimide resin.

Here, the temperature for reacting and polymerizing the tetracarboxylic acid or its derivative and the diamine is suitably selected from −20 to 150° C., preferably from −5 to 100° C.

As a method for polymerizing the polyimide resin precursor, a solution polymerization method is usually preferred. Specific examples of the solvent to be used for the solution polymerization method include N,N-dimethylformamide, N,N-dimethylacetamide, N-methyl-2-pyrrolidone, N-methylcaprolactam, dimethylsulfoxide, tetramethylurea, pyridine, dimethylsulfone, hexamethylphosphoramide and butyl lactone. Further, even a solvent which is incapable of dissolving the polyimide resin precursor, may also be used as added to the above solvent within a range where a uniform solution can be obtained.

Further, to convert the polyimide precursor to the polyimide, a method of heating for dehydration ring-closure is employed. The temperature for this heating for dehydration ring-closure can be selected optionally within a range of from 150 to 450° C., preferably from 170 to 350° C. The time required for this dehydration ring-closure is usually from 30 seconds to 10 hours, preferably from 5 minutes to 5 hours, although it may also depend on the reaction temperature.

A polyimide or polyimide precursor solution of the present invention obtained as described above, is coated on a substrate by a method such as spin coating or transfer printing and then heated and baked under the above conditions to form a polyimide film. Here, the thickness of the polyimide film is not particularly limited, but it is usually from 10 to 300 nm, when it is used as a usual liquid crystal alignment film.

Then, to the surface of the polyimide film, polarized ultraviolet rays are applied via a polarizing plate from a predetermined direction relative to the substrate. With respect to the wavelength of ultraviolet rays to be used, it is usually possible to employ ultraviolet rays within a range of from 100 to 400 nm. It is particularly preferred to select the wavelength properly through a filter or the like depending upon the type of the polyimide used.

The irradiation time of the ultraviolet rays is usually within a range of from a few seconds to a few hours, but it may suitably selected depending upon the polyimide to be used.

After preparing two substrates irradiated with polarized ultraviolet rays in such a manner, liquid crystal is sandwiched between them with the film surfaces facing each other, whereby liquid crystal molecules can be aligned.

EXAMPLES

Now, the present invention will be described in further detail with reference to the following Examples, but the present invention is by no means restricted to such specific Examples.

EXAMPLE 1

41.0 g (0.1 mol) of 2, 2-bis[4-(4-aminophenoxy)phenyl] propane and 19.2 g (0.98 mol) of 1,2,3,4-cyclobutanetetracarboxylic dianhydride were reacted in 343.5 g of N-methylpyrrolidone (hereinafter referred to simply as NMP) at room temperature for 10 hours to obtain a polyimide precursor (polyamic acid) solution. The reduced viscosity of the obtained polyimide precursor was 0.98 dl/g (concentration: 0.5 g/dl, in NMP at 30° C.).

This solution was diluted with NMP to a total solid content of 3 wt % and then spin-coated on a glass substrate at 3,000 rpm and then subjected to heat treatment at 80° C. for 5 minutes and at 250° C. for one hour, to form a polyimide resin film having a thickness of 100 nm.

Two glass substrates having a polyimide resin film thus coated, were prepared, and ultraviolet rays from a high pressure mercury lamp with an output of 500 W were applied for 60 minutes via a polarizing plate to the respective polyimide resin films.

The two substrates irradiated with polarized ultraviolet rays, were joined with a spacer of 50 µm interposed, so that the polyimide surfaces faced inside, and the directions of the irradiated polarized ultraviolet rays were parallel with each other, to obtain a cell, and liquid crystal (ZLI-2293, manufactured by Merck Company) was injected under vacuum. This cell was rotated under crossed Nicols of a polarizing microscope, whereby clear contrast was observed, and no defect was observed, and thus it was confirmed that liquid crystal was uniformly aligned.

EXAMPLE 2

15.8 g (0.1 mol) of 1,5-diaminonaphthalene and 19.2 g (0.98 mol) of 1,2,3,4-cyclobutanetetracarboxylic dianhydride were reacted in 343.5 g of NMP at room temperature for 10 hours to obtain a polyimide precursor (polyamic acid) solution. The reduced viscosity of the obtained polyimide precursor solution was 0.85 dl/g (concentration: 0.5 g/dl, in NMP at 30° C.).

This solution was diluted with NMP to a total solid content of 5 wt % and then spin-coated on a glass substrate at 3,500 rpm and then subjected to heat treatment at 80° C. for 5 minutes and 250° C. for one hour, to form a polyimide resin film having a thickness of 100 nm.

In the same manner as the method in Example 1, polarized ultraviolet rays were irradiated and then, a cell was prepared. This cell was rotated under crossed Nicols of a polarizing microscope, whereby clear contrast was observed, and no defect was observed, and thus, it was confirmed that the liquid crystal was uniformly aligned.

EXAMPLE 3

41.0 g (0.1 mol) of 2,2-bis[4-(4-aminophenoxy)phenyl] propane and 29.4 g (0.98 mol) of 3,4-dicarboxy-1,2,3,4-tetrahydro-1-naphthalenesuccinic dianhydride were reacted in 343.5 g of NMP at room temperature for 10 hours to obtain a polyimide precursor (polyamic acid) solution. The reduced viscosity of the obtained polyimide precursor solution was 0.80 dl/g (concentration: 0.5 g/dl, in NMP at 30° C.).

This solution was diluted with NMP to a total solid content of 6 wt % and then spin-coated on a glass substrate at 3,500 rpm and then subjected to heat treatment at 80° C. for 5 minutes and at 250° C. for one hour, to form a polyimide resin film having a thickness of 100 nm.

In the same manner as the method in Example 1, polarized ultraviolet rays were irradiated and then, a cell was prepared. This cell was rotated under crossed Nicols of a polarizing microscope, whereby clear contrast was observed, and no defect was observed, and thus it was confirmed that the liquid crystal was uniformly aligned.

COMPARATIVE EXAMPLE 1

41.0 g (0.1 mol) of 2,2-bis[(4-(4-aminophenoxy)phenyl] propane and 21.2 g (0.97 mol) of pyromellitic dianhydride were reacted in 343.5 g of NMP at room temperature for 10 hours to obtain a polyimide precursor (polyamic acid) solution. The reduced viscosity of the obtained polyimide precursor solution was 1.10 dl/g (concentration: 0.5 g/dl, in NMP at 30° C.).

This solution was diluted with NMP to a total solid content of 3 wt % and then spin-coated on a glass substrate at 4,500 rpm, and then subjected to heat treatment at 80° C. for 5 minutes and at 250° C. for one hour, to form a polyimide resin film having a thickness of 100 nm.

In the same manner as the method in Example 1, polarized ultraviolet rays were irradiated and then, a cell was prepared. This cell was rotated under crossed Nicols of a polarizing microscope, whereby many defects were observed although some contrast was observed, and the liquid crystal was not uniformly aligned.

INDUSTRIAL APPLICABILITY

By employing the polyimide resin of the present invention and applying polarized ultraviolet rays to the film surface in a predetermined direction, liquid crystal molecules can be aligned uniformly and constantly without carrying out rubbing treatment which is the conventional treating method for liquid crystal alignment. Further, in the liquid crystal alignment method employing polarized light irradiation, it becomes possible to select a wider structural system, and it becomes possible to provide a practical treating method for liquid crystal alignment which has much more functions as a liquid crystal alignment film.

What is claimed is:

1. A treating method for liquid crystal alignment, comprising:

applying polarized ultraviolet or electron rays to a polymer thin film formed on a substrate, in a predetermined direction relative to the substrate surface, and using the substrate to align liquid crystal without rubbing treatment, wherein the polymer thin film is a polyimide resin containing a repeating unit of the formula (I):

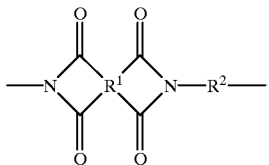

(I)

wherein $R^1$ is a member selected from the group consisting of:

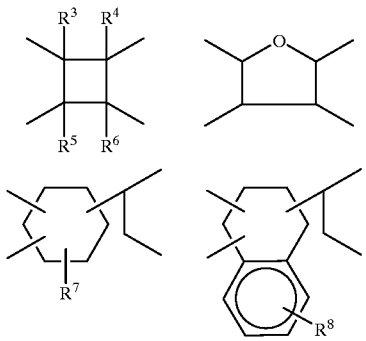

wherein each of $R^3$, $R^4$, $R^5$ and $R^6$ is, independently, hydrogen or a $C_{1-4}$ organic group, $R^7$ is hydrogen, fluorine or a $C_{1-2}$ organic group, and $R^8$ is hydrogen, fluorine or a $C_{1-4}$ organic group; and $R^2$ is a bivalent organic group;

wherein the polyimide resin is obtained by dehydration ring-closure of a polyimide precursor having a reduced viscosity of from 0.05 to 3.0 dl/g as measured in N-methyl-2-pyrrolidone at a temperature of 30° C. at a concentration of 0.5 g/dl.

2. The method of claim 1, wherein the group $R^1$ is obtained from a compound selected from the group consisting of 1,2,3,4-cyclobutanecarboxylic acid, 2,3,4,5-tetrahydrofurantetracarboxylic acid, 3,4-dicarboxy-1-cyclohexylsuccinic acid, 3,4-dicarboxy-1,2,3,4-tetrahydro-1-naphthalenesuccinic acid, anhydrides thereof and dicarboxylic acid diacid halides thereof.

3. The method of claim 1, wherein the group $R^2$ is obtained from a diamino compound selected from the group consisting of aromatic diamines, alicyclic diamines, aliphatic diamines and diaminosiloxanes.

4. The method of claim 3, wherein said diamino compound is a member selected from the group consisting of p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminobiphenylmethane, diaminodiphenylether, 2,2'-diaminodiphenylpropane, bis(3,5-diethyl-4-diaminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy) diphenylsulfone, 2,2-bis[4-(aminophenoxy)phenyl]propane, 2,2-bis(4-aminophenyl) hexafluoropropane, 2,2-bis[4-(4-aminophenoxy)phenyl] hexaflouropropane, bis(4-aminocyclohexyl)methane, bis(4-amino-3-methylcyclohexyl)methane, tetramethylenediamine, hexamethylenediamine, 4,4'-diamino-3-dodecyldiphenyl ether and 1-dodecanoxy-2,4-diaminobenzene.

5. The method of claim 1, wherein said polarized ultraviolet rays are applied using a polarizing plate.

6. The method of claim 1, wherein said polarized ultraviolet rays have a wavelength of from 100 to 400 nm.

7. The treating method for liquid crystal alignment according to claim 4, wherein in the formula (I), $R^1$ is a polyimide containing the following structure:

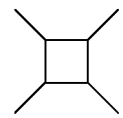

* * * * *

UNITED STATES PATENT AND TRADEMARK OFFICE
CERTIFICATE OF CORRECTION

PATENT NO. : 6,063,829
DATED : May 16, 2000
INVENTOR(S) : Hideyuki Endou, et al.

It is certified that error appears in the above-identified patent and that said Letters Patent is hereby corrected as shown below:

<u>Title page,</u>
Items [86] and [87] have been omitted. The PCT information should read as follows:

-- [22] PCT filed:     February 28, 1997
   [86] PCT No.:       PCT/JP97/00603
      §371 Date:       September 4, 1998
      §102(e) Date:    September 4, 1998
   [87] PCT Pub. No.:  WO97/33191
      PCT Pub. Date:   September 12, 1997 --

<u>Column 1,</u>
First paragraph, the PCT information has been omitted. The Paragraph should read as follows:

-- This Application is a 371 of PCT/JP97/00603, filed February 28, 1997. --

Signed and Sealed this

Fourth Day of September, 2001

Attest:

*Nicholas P. Godici*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

Page 1 of 1

PATENT NO. : 6,063,829
DATED : May 16, 2000
INVENTOR(S) : Hideyuki Endou et al

It is certified that error appears in the above-identified patent and that said Letters Patent is hereby corrected as shown below:

ABSTRACT,
"300°C" should read -- 30°C --.

Signed and Sealed this

First Day of January, 2002

Attest:

Attesting Officer

JAMES E. ROGAN
*Director of the United States Patent and Trademark Office*